(12) United States Patent
Hong

(10) Patent No.: US 11,493,316 B2
(45) Date of Patent: Nov. 8, 2022

(54) APPARATUS FOR MEASURING THICKNESS OF BATTERY MATERIALS

(71) Applicant: LG Chem, Ltd., Seoul (KR)

(72) Inventor: Sung Min Hong, Daejeon (KR)

(73) Assignee: LG Energy Solution, Ltd.

( * ) Notice: Subject to any disclaimer, the term of this patent is extended or adjusted under 35 U.S.C. 154(b) by 718 days.

(21) Appl. No.: 16/472,603

(22) PCT Filed: Aug. 10, 2017

(86) PCT No.: PCT/KR2017/008661
§ 371 (c)(1),
(2) Date: Jun. 21, 2019

(87) PCT Pub. No.: WO2018/155775
PCT Pub. Date: Aug. 30, 2018

(65) Prior Publication Data
US 2020/0191543 A1  Jun. 18, 2020

(30) Foreign Application Priority Data

Feb. 24, 2017  (KR) .......................... 10-2017-0024441

(51) Int. Cl.
*G01B 5/06* (2006.01)
*H01M 4/04* (2006.01)

(52) U.S. Cl.
CPC ................ *G01B 5/06* (2013.01); *H01M 4/04* (2013.01)

(58) Field of Classification Search
CPC ............ G01B 5/06; H01M 4/04; Y02E 60/10
See application file for complete search history.

(56) References Cited

U.S. PATENT DOCUMENTS

| 5,491,421 A | * | 2/1996 | Katsuie | .................. G01B 7/087 |
| | | | | 324/716 |
| 9,879,971 B2 | * | 1/2018 | Wang | ........................ G01B 7/16 |

(Continued)

FOREIGN PATENT DOCUMENTS

| CN | 102901438 A | 1/2013 |
| CN | 103363887 A | 10/2013 |

(Continued)

OTHER PUBLICATIONS

Chinese Search Report for Application No. 201780063550.X, dated Jun. 22, 2020, pp. 1-2.

(Continued)

*Primary Examiner* — Yaritza Guadalupe-Mccall
(74) *Attorney, Agent, or Firm* — Lerner, David, Littenberg, Krumholz & Mentlik, LLP (57) ABSTRACT

The present invention provides an apparatus for measuring thickness of thin materials used for batteries such as an electrode and a separator, the apparatus including an inductive sensor for measuring a length displacement, wherein the sensor comprises a sensor tip having a spherical surface that is retracted by vacuum; a bottom tip disposed on an opposite side of the sensor tip with respect to a sample to support the sample and having a spherical surface; a decompression unit includes a pump to apply a reduced pressure to retract the sensor tip, a motor, a power source, and a control unit; a body including a top surface on which the sample is placed, at a center of which the bottom tip is disposed; and a fixing unit disposed on the body, wherein the sensor is fixed to the fixing unit.

8 Claims, 7 Drawing Sheets

(56) References Cited

U.S. PATENT DOCUMENTS

| | | | | |
|---|---|---|---|---|
| 10,209,054 | B2* | 2/2019 | Andrews | B60C 9/0007 |
| 2001/0046715 | A1* | 11/2001 | Takemoto | G01R 1/06738 |
| | | | | 438/2 |
| 2010/0241397 | A1* | 9/2010 | Fischer | G01B 5/0004 |
| | | | | 702/170 |
| 2012/0011934 | A1* | 1/2012 | Matsui | B23K 20/004 |
| | | | | 73/588 |
| 2017/0074633 | A1* | 3/2017 | Wang | G01B 7/16 |
| 2017/0307349 | A1* | 10/2017 | Andrews | G01M 17/02 |
| 2018/0087886 | A1 | 3/2018 | Beal et al. | |
| 2020/0191543 | A1* | 6/2020 | Hong | H01M 4/04 |

FOREIGN PATENT DOCUMENTS

| | | |
|---|---|---|
| CN | 104220213 A | 12/2014 |
| CN | 204666118 U | 9/2015 |
| JP | 2000-131011 A | 5/2000 |
| JP | 2000147004 A | 5/2000 |
| JP | 2000-337859 A | 12/2000 |
| JP | 2000337859 A | 12/2000 |
| JP | 2006-153732 A | 6/2006 |
| JP | 3137343 U | 11/2007 |
| JP | 2010-217182 A | 9/2010 |
| JP | 2016-225119 A | 12/2016 |
| KR | 10-2003-0084052 A | 11/2003 |
| KR | 10-2008-0074240 A | 8/2008 |
| KR | 2014-0140013 A | 12/2014 |
| KR | 10-1516616 B1 | 5/2015 |
| KR | 101516616 B1 | 5/2015 |
| KR | 10-2016-0008879 A | 1/2016 |
| KR | 101691402 B1 | 12/2016 |
| WO | 2013128988 A1 | 9/2013 |
| WO | 2016156701 A1 | 10/2016 |

OTHER PUBLICATIONS

Mahn 1340 Data Sheet, 2 pages.
Height Gauges—TESA-uHITE—_TESA TEchnology, 1 page.
TESA uHITE, jpg, 1page.
Mahr GmbH—Inductive Probe, Millimar 1340 Operating Instructions, 10 pages, www.docin.com/p-578565152.html.
Extended European Search Report including Written Opinion for Application No. EP17897792.2 dated Nov. 15, 2019.
Mahr Gmbh: :Millimar 1340—Inductive Probe—Mahr Metrology, Jul. 27, 2016, XP055638861, Retrieved from the Internet: URL:https://web.archive.org/web/20160727152641 /http://www.mahr.com/en/Services/Production-metrology/Products/Millimar—Electrical LengthMeasuring-Instruments-and-Multi-Gaging-Metrology/Millimar—InductiveProbe/Millimar-1340—Inductive-Probe/ [retrieved Nov. 5, 2019].

* cited by examiner

FIG. 1

(Related Art)

APPARATUS FOR MEASURING THICKNESS OF BATTERY MATERIALS

CROSS-REFERENCE TO RELATED APPLICATION

This application is a U.S. national phase application, pursuant to 35 U.S.C. § 371, of PCT/KR2017/008661 filed on Aug. 10, 2017, designating the United States, which claims the benefit of the priority of Korean Patent Application No. 10-2017-0024441 filed on Feb. 24, 2017, which applications are hereby incorporated by reference in their entirety.

TECHNICAL FIELD

The present invention relates to an apparatus for measuring the thickness of battery materials, more particularly, to an apparatus capable of measuring the thickness of secondary battery materials such as a cathode, an anode, and a separator with high precision and high accuracy.

BACKGROUND ART

With the recent progress in the weight reduction and functionality increase of portable devices such as smart phones, notebooks, tablet PCs, portable game machines, the demand for secondary batteries as driving power sources is changing. Although nickel-cadmium, nickel-hydrogen, nickel-zinc batteries, or the like were used in the past, lithium secondary batteries, which have high operating voltages and high energy densities per unit weight, are the most popular at present. In recent years, attempts to reduce the thickness of their materials are underway to further increase the energy density.

The electrodes of lithium secondary batteries are manufactured by applying a paste containing a cathode active material or an anode active material and a binder to the surface of a current collector such as an aluminum or copper thin film, and then compressing and drying it. The separator is manufactured by mixing inorganic particles, a binder, or the like, applying the resultant mixture on at least one side of a polymer substrate, and then drying it.

If electrode materials such as an electrode or a separator are not applied with a uniform thickness, problems occur, such as that current is likely to concentrate on a thick part during charging and discharging, and that a short circuit occurs at a relatively thin part. Therefore, quality control on the application of electrode materials with a uniform thickness is an important factor that determines the stable life of a battery.

The thickness of electrode materials is measured during various processes such as the current collector itself, after the application of active materials, and after coating the separator. For the quality control of the product, the thickness measurement should satisfy both of the two criteria of accuracy and precision. Materials that exceed or fall below the criteria upon measurement should be considered defective and excluded from the manufacturing process. In recent years, due to the thickness reduction of products using secondary batteries, such as smart phones, accuracy and precision higher than in the past are required, and the thickness is increasingly becoming the cause of the product failures.

Non-Patent Literature 1 relates to μHITE, an apparatus for measuring height (thickness) manufactured by TESA, Inc. This apparatus is one of the conventional apparatuses for measuring the thickness of electrode materials. The apparatus is capable of measuring down to 100 mm, with an accuracy of ±1 μm. It has a measurement pressure of 0.63N. Both sides of the contact surfaces for measuring the thickness of a sample are flat. The apparatus has problems that it is not possible to correct measurement errors and that it does not provide enough accuracy and precision to meet the current demand for the thickness reduction.

Figure 1:
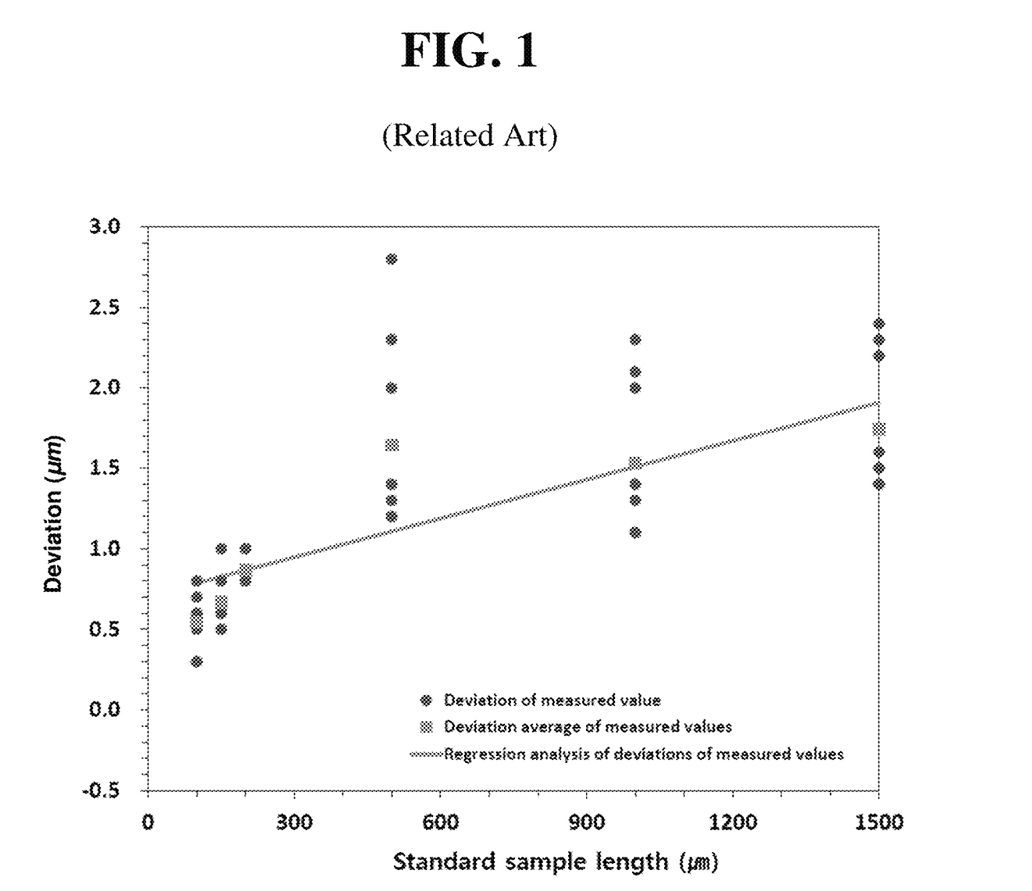
FIG. 1 shows the thickness measurement results of standard gauge blocks (100, 150, 200, 500, 1000, and 1500 μm) using a conventional apparatus for measuring thickness (Non-Patent Literature 1).

Nine measurements were made using the apparatus of Non-Patent Literature 1 and standard samples with the standard thicknesses of 100, 150, 200, 500, 1000, and 1500 μm, and the following gage bias and gage linearity were obtained as shown in Table 1. The related measurement results are shown in FIG. 1.

TABLE 1

| Gage bias | | | | | | Gage linearity |
|---|---|---|---|---|---|---|
| 100 μm | 150 μm | 100 μm | 150 μm | 100 μm | 150 μm | 100 μm |
| 0.544 | 0.667 | 0.544 | 0.667 | 0.544 | 0.667 | 0.544 |

The apparatus of Non-Patent Literature 1 showed a deviation of up to 1.75 μm depending on the measurement object. Analysis of the Gage R&R results showed that the output exceeded the acceptable level of 30% (Table 2). Thus, the apparatus was found to be inapplicable to the recent thickness reduction technologies.

TABLE 2

| Item | Acceptable level | Gauge R&R result |
|---|---|---|
| % Study variation | ≤30% | 38.18% |
| % Tolerance | ≤30% | 43.66% |
| Number of distinct categories | ≥4 | 3 |
| % Contribution | — | 14.58% |
| % Repeatability | — | 7.22% |
| % Reproducibility | — | 7.36% |

Meanwhile, the field application results of the technology of Non-Patent Literature 1 showed deviations of 1-1.5 μm, 0-3.5 μm, and 1.2-4.7 μm depending on the measurement site and the measurer although an identical standard sample of 100 μm was used. These deviations mean that the error caused by a deviation may be 30% or more when determining the defect rate of a product, which exceeds the acceptable level of quality control. Thus, Non-Patent Literature 1 is insufficient for application to the future development and production of electrodes, and needs to be improved.

Patent Literature 1 relates to a method and apparatus for measuring the thickness of sheet-like electrodes. It is to provide a method and apparatus for measuring thickness with high precision by avoiding or minimizing the influence of the surface state and deformation of sheet-like electrodes, vibration during measurement, etc.

In Patent Literature 1, a sheet-like electrode 1 is pressed by a pair of rollers 5 and 5' arranged on the opposite sides thereof, and a pair of contact-type displacement sensors 2 and 3, each of which perpendicularly faces one side of the sheet-like electrode 1 within the pressed region, are made to abut the sheet-like electrode 1 under a constant pressure to measure the thickness of the sheet-like electrode 1. The invention of the measurement apparatus is also characterized in that it is provided with a conveyer mechanism 4 to convey the sheet-like electrode 1, a pair of contact-type displacement sensors 2 and 3, with the sheet-like electrode 1 interposed therebetween, where the sheet-like electrode 1 is conveyed by the conveyer mechanism 4, and the contact-type displacement sensors 2 and 3 are arranged perpendicularly on surfaces of the sheet-like electrode 1, and a plurality of pairs of pressure roller mechanisms 5 and 5', which are adjacent to the contact-type displacement sensors 2 and 3 and arranged slidably to press the sheet-like electrode 1. The pressure roller mechanisms 5 and 5' are arranged slidably at at least one of the front, rear, right and left positions with respect to the contact-type displacement sensors 2 and 3.

Patent Literature 1 is to continuously measure the thickness of a sheet-like electrode that is continuously moved and discharged through rollers. Because it measures the thickness using the relative potential values of the displacement sensors disposed on both sides of the sheet, it allows to obtain stable values even if the discharged sheet moves slightly up and down. However, it does not disclose a specific method for measuring with high precision and high accuracy to meet the demand for thickness reduction as sought by the present invention.

Patent Literature 2 relates to a contact-type apparatus for measuring film thickness and a method of using the same. It is to provide a contact-type apparatus for measuring film thickness, capable of constantly and precisely measuring the average film thickness of a predetermined region, regardless of the surface shape and constituent materials of an electrode material layer on a sheet-like electrode member. To this end, the apparatus of Patent Literature 2 is equipped with a surface plate that includes a flat surface and a measurement device that includes a flat contact surface. Thin film member is sandwiched between the surface of the surface plate and the contact surface of the measurement device, and the thickness of the thin film member is measured. At least the mounting surface of the surface plate is made of ceramics.

The contact portion of the sensor for measuring thickness usually has a probe shape, but in such cases, a deformed portion of a fine portion may be measured depending on the roughness of the surface to be measured. In this case, a measurement error with a large difference from the actual value may occur. For this reason, Patent Literature 2 changed the end portion of the measurement probe into a flat shape to measure the average value. Although Patent Literature 2 presents a method for reducing detailed errors in measurement, it does not provide a specific method for measuring thickness with high precision and high accuracy as sought by the present invention.

Patent Literature 3 relates to a method for measuring the thickness of electrode plates. It is to provide a method for measuring the thickness of electrode plates with high precision. To this end, Patent Literature 3 performs the reference detection process of detecting reference index values of a plurality of reference detection points on a reference surface by a displacement sensor, the reference average calculation process of calculating a reference differential value indicating a distance between a virtual reference average surface obtained by correcting the reference surface into a plane and a first reference detection point, and the electrode detection process of detecting an electrode index value of an electrode detection point on an electrode plate by a displacement sensor and at the same time calculating a reference electrode differential value indicating a difference between the first reference detection point and the electrode detection point based on the reference index value of the first reference detection point and the electrode index value. Further, a displacement amount is calculated from the sum of the reference differential value and the reference electrode differential value. The displacement amount is then used to calculate the measurement of the thickness of the electrode plate.

Patent Literature 3 uses a laser displacement sensor to measure the values of a plurality of detection points. The thicknesses of a sample without an electrode and of a sample with an electrode are measured. Then, the thickness of the electrode is determined using the relative difference between the values. However, Patent Literature 3 does not disclose a specific method for measuring thickness with high precision and high accuracy as sought by the present invention.

Conventional technologies only describe the general principles of measuring distances through physical contact or using ultrasonic waves, laser, etc. without providing a practical method that can ensure high accuracy and high precision. In particular, it can be seen that the technology of Non-Patent Literature 1, which is currently used in the field, does not provide a technology that meets the current demand for thickness reduction of electrodes.

CITATION LIST

Patent Literature

Patent Literature 1: Japanese Patent Application Publication No. 2000-337859
Patent Literature 2: Japanese Patent Application Publication No. 2006-153732
Patent Literature 3: Japanese Patent Application Publication No. 2016-225119

Non-Patent Literature

Non-Patent Literature 1: TESA-μHITE Product Catalog (http://www.tesatechnology.com/en-gb/products/tesa-%C2% B5hite-f170.htm#.WKIpqTuLSUk)

DISCLOSURE

Technical Problem

As described above, the present invention provides a method for measuring the thickness of battery materials with high precision and high accuracy to meet the current demand for thickness reduction of secondary batteries or the like.

Technical Solution

In order to achieve the above objective, a first aspect of the present invention provides an apparatus for measuring thickness of thin materials used for batteries such as an electrode and a separator. The apparatus includes an inductive sensor for measuring a length displacement, wherein a maximum measurement displacement is 4 mm, a maximum measurement error is equal to or less than 0.01% of measurement displacement and equal to or less than 0.4 μm, a measurement force is 0.75N, a measurement force increment per distance increment is 0.08 N/mm, and the sensor comprises a sensor tip having a spherical surface that is retracted by vacuum; a bottom tip disposed on an opposite side of the sensor tip with respect to a sample to support the sample and having a spherical surface; a decompression unit, which consists of a pump capable of applying a predetermined reduced pressure to retract the sensor tip, a motor, a power source, and a control unit; a body, which has a top surface on which the sample is placed, and at the center of which the bottom tip is located; and a fixing unit, which is located on a side surface of the body and to which the sensor is fixed to measure the thickness of the sample.

A second aspect of the present invention provides an apparatus for measuring thickness, further comprising a display for displaying values measured by the sensor, and an output unit for outputting the measured values to be displayed on the display.

A third aspect of the invention provides an apparatus for measuring thickness, wherein the bottom tip and the sensor tip are made of a resin or a metal.

A fourth aspect of the present invention provides an apparatus for measuring thickness, wherein the control unit comprises a mode capable of providing a predetermined reduced pressure, either manually or periodically and automatically.

A fifth aspect of the present invention provides an apparatus for measuring thickness, wherein the reduced pressure is determined to allow measurement error due to decompression of the decompression unit is equal to or less than ±0.1 μm.

A sixth aspect of the present invention provides a method for measuring the thickness of thin materials used for batteries using the apparatus for measuring thickness.

A seventh aspect of the present invention provides a method for discriminating defects of thin materials used for batteries, comprising the steps of: 1) measuring thickness of thin materials used for batteries with the apparatus for measuring thickness according to any one of first to fifth aspects of the present invention; and 2) comparing the value measured at the step 1) with a predetermined reference value to determine whether the material is defective.

BEST MODE

Hereinafter, the present invention will be described in detail. Prior to the description, it should be understood that the terms used in the specification and the appended claims should not be construed as limited to general and dictionary meanings, but interpreted based on the meanings and concepts that comply with the technical idea of the present disclosure on the basis of the principle that the inventor is allowed to define terms appropriately for the best explanation. Therefore, the embodiments disclosed in the present specification are merely the most preferred embodiments of the present disclosure, and they do not represent the entire technical idea of the present disclosure, and thus it should be understood that there may be various equivalents and modified examples that could substitute them at the time of filing the present application.

The present invention provides an apparatus for measuring thickness, which is capable of measuring the thickness of thin materials used for batteries such as an electrode and a separator, and the apparatus includes an inductive sensor for measuring a length displacement, wherein the maximum displacement of measurement distance is 4 mm, the maximum measurement error is equal to or less than 0.01% of the measurement displacement and is equal to or less than a maximum of 0.4 μm, the measurement force is 0.75N, the measurement force increment per distance is 0.08 N/mm, and the sensor comprises a sensor tip having a spherical surface and configured to be retracted by vacuum; a bottom tip, which is located on the opposite side of the sensor tip with respect to a sample in order to support the sample, and which has a spherical surface; a decompression unit, which consists of a pump capable of applying a predetermined reduced pressure to retract the sensor tip, a motor, a power source, and a control unit; a body, which has a top surface on which the sample can be placed, and at the center of which the bottom tip is located; and a fixing unit, which is located on a side surface of the body and to which the sensor is fixed to measure the thickness of the sample.

A statistical means that is usually used in measuring thicknesses and verifying their reliability is to perform same measurements a plurality of times under given conditions and check the repeatability and reproducibility thereof (Gage R&R).

According to the guidelines of Automated Industry Action Group (AIAG) (2010), Measurement Systems Analysis Reference Manual, 4th edition, a measurement system variation is acceptable when the variation is less than 10% of the process variation (tolerance). The criteria are summarized below in Table 3.

TABLE 3

| Classification | % Contribution | % Tolerance | Discrimination index |
| --- | --- | --- | --- |
| Acceptable | Less than 1% | Less than 10% | 10 or more |
| Conditionally acceptable | 1-10% | 10-30% | 4-9 |
| Not applicable | 10% or more | 30% or more | Less than 4 |

As shown in the Description of the Related Art section, the technology of Non-Patent Literature 1 has a tolerance of 43.66%, which is not suitable for use for the current thin electrode materials. In order to solve the problem, the inventor of the present invention used the probe Millimar 1340 for film thickness measurement, which is manufactured by Mahr based in Germany, among the sensors for measuring thickness. The probe has a maximum measurement displacement of 4 mm, a maximum measurement error equal to or less than 0.01% of the measurement displacement and equal to or less than a maximum of 0.4 μm, a measurement force of 0.75N, and a measurement force increment per distance increment of 0.08 N/mm. The probe includes a sensor tip configured to be retracted by vacuum.

Figure 2:
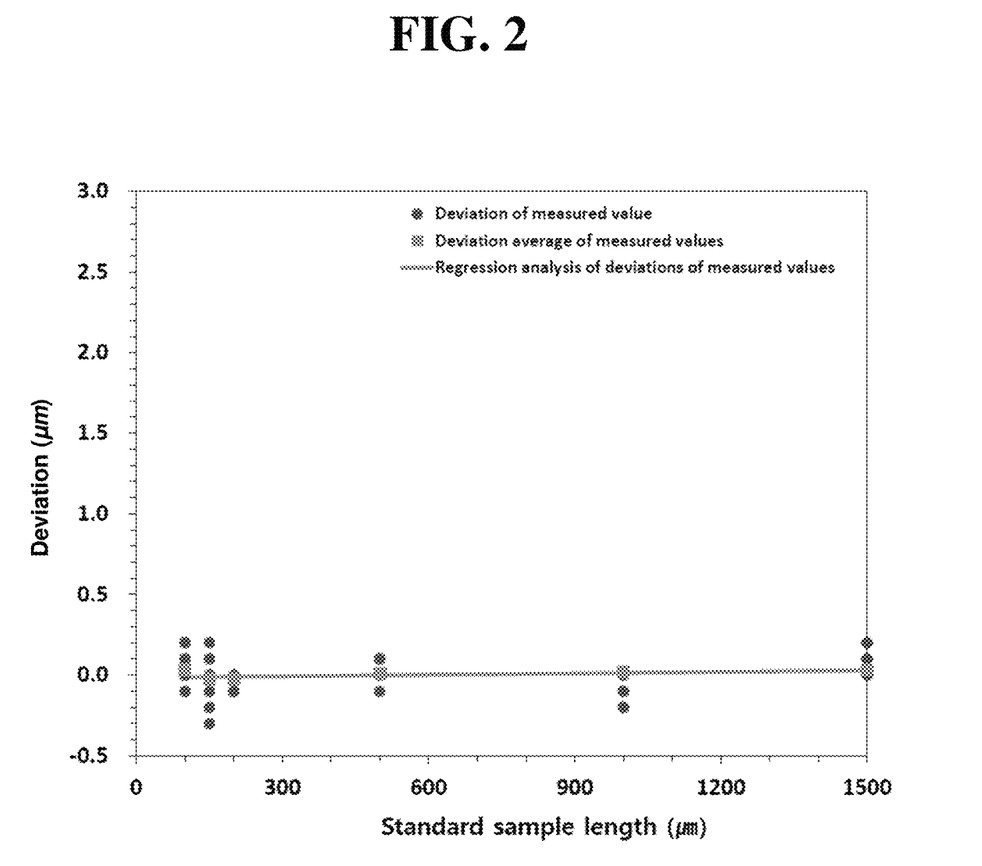
FIG. 2 shows the thickness measurement results of standard gauge blocks (100, 150, 200, 500, 1000 and 1500 μm) using the apparatus for measuring thickness according to the present invention.

Using the above sensor as supplied, nine measurements were made using standard samples with standard thicknesses of 100, 150, 200, 500, 1000, and 1500 μm, and the following gage bias and gage linearity were obtained (Table 4). The related measurement results are shown in FIG. 2.

TABLE 4

| Gage bias | | | | | | Gage linearity Slope |
|---|---|---|---|---|---|---|
| 100 μm | 150 μm | 200 μm | 500 μm | 1000 μm | 1500 μm | coefficient |
| 0.033 | −0.022 | −0.022 | 0.011 | 0.022 | 0.033 | 0.000026 |

Deviations of up to 0.033 μm occurred depending on the measurement object. Thus, the accuracy and linearity were found to be excellent. Analysis of the Gage R&R results showed that the output was less than 10%, which is acceptable (Table 5). Thus, the apparatus was confirmed to be acceptable.

TABLE 5

| Item | Acceptable level | Gauge R&R result |
|---|---|---|
| % Study variation | ≤30% | 9.70% |
| % Tolerance | ≤30% | 14.27% |
| Number of distinct categories | ≥4 | 14 |
| % Contribution | — | 0.94% |
| % Repeatability | — | 0.83% |
| % Reproducibility | — | 0.11% |

Meanwhile, Millimar C1240M of Mahr GmBH was used as the apparatus for displaying the signals generated from the probe, to indicate the measurement results.

The probe measures thickness based on a method in which the sensor tip is retracted using a manual vacuum lifter, a sample to be measured is placed, and the lifter is opened so that the sensor tip is lowered to measure thickness.

The present inventor initially tried to apply the method of retracting the sensor tip using the vacuum lifter supplied together with the sensor. However, it was found that unexpected errors occurred in the measurement results due to a difference in the measurer and the process. In particular, the sensor tip driven by air had problems that not only the pressure of air that retreats the sensor tip varies depending on the measurer but also an error occurs in actual measurement values due to this variation. Thus, the inventor of the present invention invented an additional component to solve these problems.

The decompression unit of the present invention consists of a pump capable of applying a predetermined reduced pressure to retract the sensor tip, a power source, and a control unit. Specifically, the decompression unit consists of a geared motor, a speed adjuster capable of adjusting the speed of the motor, a power supply for supplying power, a piston for reducing pressure to retract the sensor tip, and a programmable logic controller (PLC) capable of controlling the movement of the piston based on the selection of an external switch.

Use of these components enabled to minimize the errors due to a difference in the measurer and the measurement environment that may occur when the supplied sensor is applied in the field.

Figure 3:
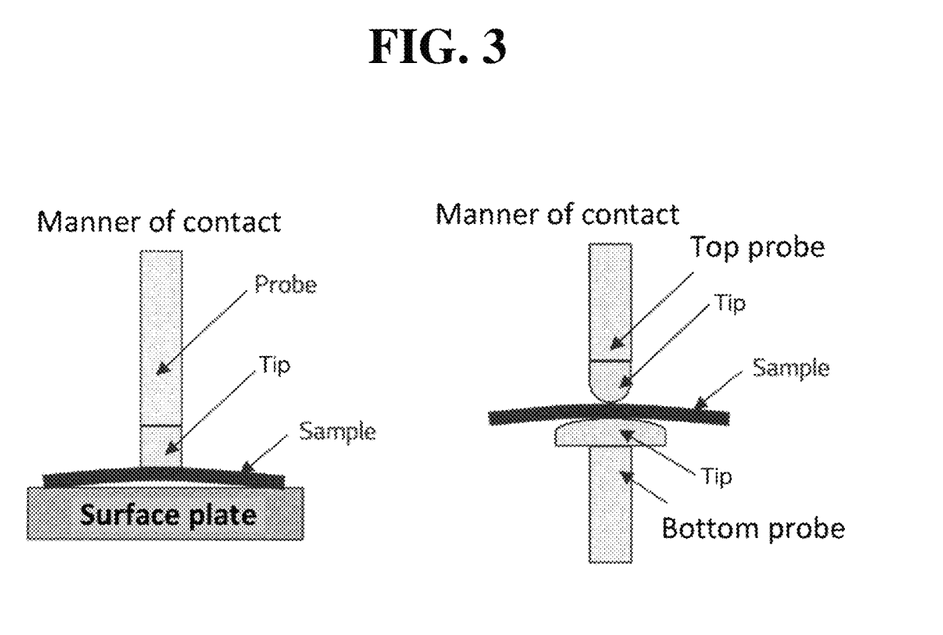
FIG. 3 is a schematic view explaining a measurement error due to the shape of the probe and the surface plate.

Meanwhile, the inventor of the present invention recognized that most of the electrode materials measured by the present invention had a certain degree of elasticity, and thus that an error might occur even when the sensor supplied by default was applied to a surface plate (plane) (see FIG. 3).

In the case of measurement using the method of contacting the probe (plane) and the surface plate (plane) (left case in FIG. 3), the thickness of a film is calculated by measuring the displacement value of the probe with respect to the surface plate itself as a base. In this case, a film-shaped sample may be deformed, which may cause the surface of the surface plate not to be in close contact with the probe, causing the measured value larger than the actual value. In addition, since the degree of bending of the film varies depending on the pressing force of the probe, a measurement error due to this may also occur. In other words, the measurement errors for a sample include an error due to the position of the surface plate itself, an error due to sample lift, and an error due to a distortion resulting from the pressing force of the probe. In order to achieve high precision and high accuracy as sought by the present invention, these matters need to be improved.

In order to solve the above problems, the present inventor changed the method for measuring a sample to a method shown at the right side of FIG. 3. In this method, a probe (spherical surface) is contacted with a surface plate (spherical surface). This method allows to minimize the deformation of a film-shaped sample by using the top/bottom spherical surfaces and enables to bring the spherical surfaces into contact with the sample as close as possible during the measurement.

In the present invention, the measurement errors due to the degree of compression and the degree of sphericity of the probe and the surface plate, which are the problems of the supplied sensor, were specifically measured. The precision was measured using a standard gauge block 150 μm. The measurement was performed using conventional cathode materials, followed by Gage R&R analysis (ANOVA). The accuracy measurement results are shown below.

TABLE 6

| Classification | Test method | | OP 1 (average) | OP 2 (average) | OP 3 (average) | Whole (average) |
|---|---|---|---|---|---|---|
| | Tip shape | Descent speed | | | | |
| Test 1 | Top: Spherical/ Bottom: Spherical | Fast | 150.0 | 150.0 | 150.0 | 150.0 |
| Test 2 | Top: Spherical/ Bottom: Spherical | Slow | 150.0 | 150.1 | 150.0 | 150.0 |
| Test 3 | Top: Spherical/ Bottom: Flat | Fast | 150.4 | 150.4 | 150.4 | 150.4 |
| Test 4 | Top: Spherical/ Bottom: Flat | Slow | 150.4 | 150.3 | 150.4 | 150.3 |
| Test 5 | Top: Flat/ Bottom: Flat | Fast | 150.5 | 150.5 | 150.6 | 150.5 |
| Test 6 | Top: Flat/ Bottom: Flat | Slow | 150.6 | 150.5 | 150.5 | 150.6 |

According to the above accuracy analysis, Test 1 and Test 2 obtained the most excellent results. Thus, it was confirmed that the most accurate result can be obtained when selecting a spherical surface as the surfaces of the top and bottom tips.

The results of Gage R&R analysis for precision measurement are as shown below.

TABLE 7

| Classification | Tip shape | Descent speed | Gage R&R | | | Discrimination index | Result |
| --- | --- | --- | --- | --- | --- | --- | --- |
| | | | % Contribution | % Tolerance | % Study variation | | |
| Test 1 | Top: Spherical/ Bottom: Spherical | Fast | 1.31 | 11.45 | 13.67 | 12 | Conditionally acceptable |
| Test 2 | Top: Spherical/ Bottom: Spherical | Slow | 0.44 | 6.61 | 7.54 | 21 | Acceptable |
| Test 3 | Top: Spherical/ Bottom: Flat | Fast | 3.04 | 17.43 | 21.24 | 7 | Conditionally acceptable |
| Test 4 | Top: Spherical/ Bottom: Flat | Slow | 5.03 | 22.42 | 23.4 | 6 | Conditionally acceptable |
| Test 5 | Top: Flat/ Bottom: Flat | Fast | 3.67 | 19.17 | 21.77 | 7 | Conditionally acceptable |
| Test 6 | Top: Flat/ Bottom: Flat | Slow | 3.56 | 18.87 | 23 | 7 | Conditionally acceptable |

The above results show that the highest precision was obtained when the top and bottom tips had a spherical surface and when the descent speed was slow.

Figure 4:
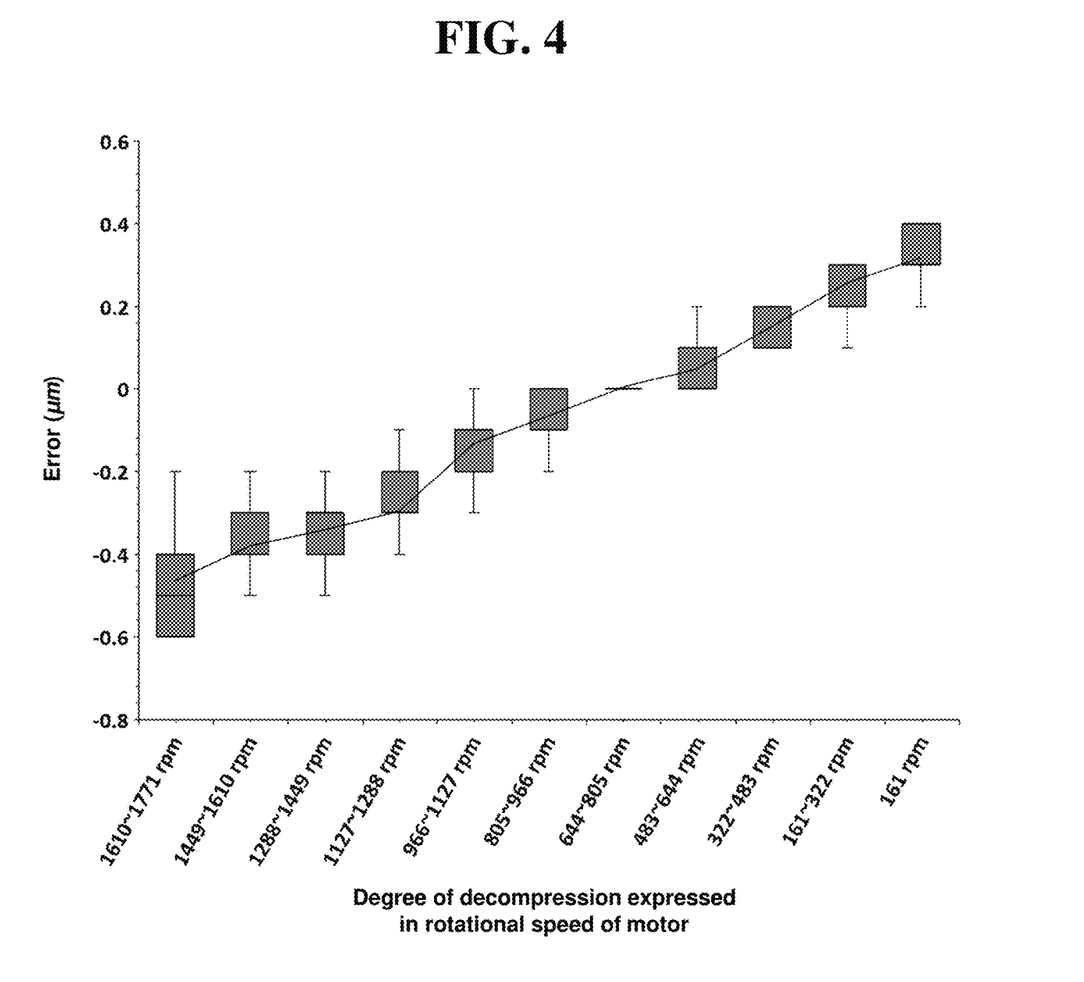
FIG. 4 shows the results of the measurement value variation in relation to the reduced pressure.

In order to establish sound standards for the descent speed (degree of decompression), the present inventor investigated the variation of the measured value in relation to the descent speed. FIG. 4 shows the results. The x-axis in FIG. 4 represents the degree of decompression in relation to the decompression condition, which is represented as the rotational speed of the motor. The higher the rotational speed is, the higher the degree of decompression is. The y-axis in FIG. 4 represents the range of the error value for standard sample measurement. As shown in FIG. 4, when the sensor according to the present invention is manually operated, a measurement error may occur depending on the degree of decompression. Thus, it is not possible to increase the accuracy simply by slowing the descent speed. It can be seen that it is necessary to determine the decompression condition that does not cause a measurement error, prior to using the apparatus. The specifications of the sensor used in the present invention states that it achieves very high precision and accuracy. However, a high level of separate refinement operations as in the present invention are required to perform high precision and high accuracy measurement for discrimination of defects.

In the embodiment according to the present invention, an error did not occur when the decompression condition (motor rpm) was 644 to 805. The set value was input to the control PLC of the decompression unit in advance. Based on this, the present invention obtained very precise and consistent values regardless of the measurer.

Figure 5:
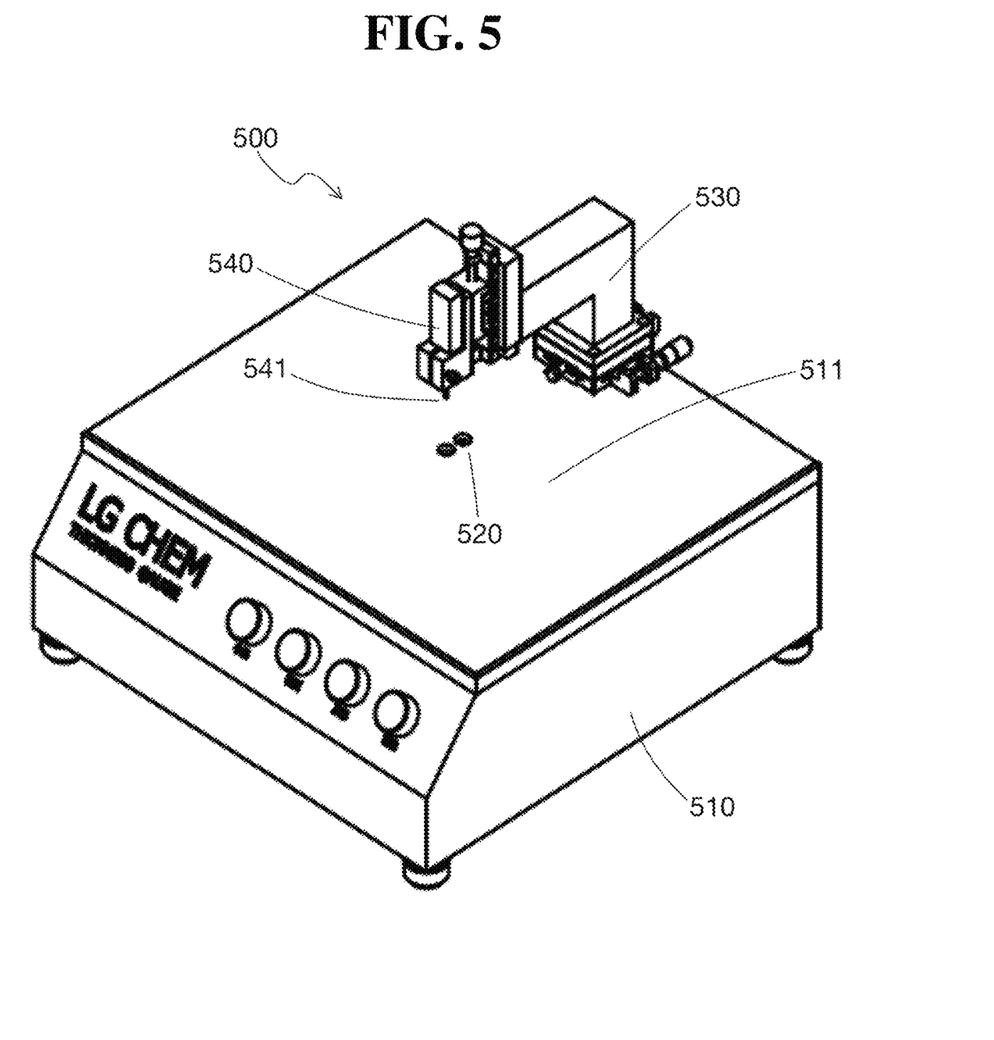
FIG. 5 is a perspective view of the measurement apparatus according to the present invention.
Figure 6:
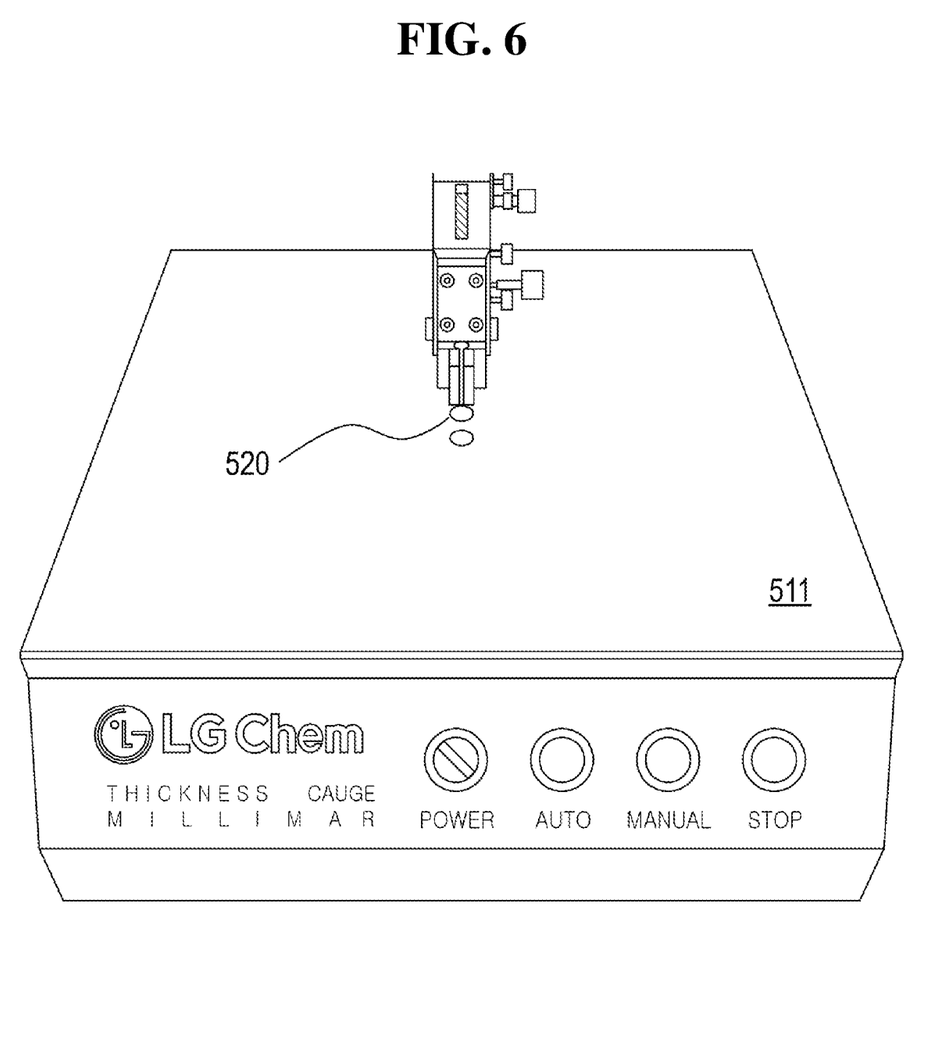
FIG. 6 and FIG. 7 show the photographs thereof.
Figure 7:
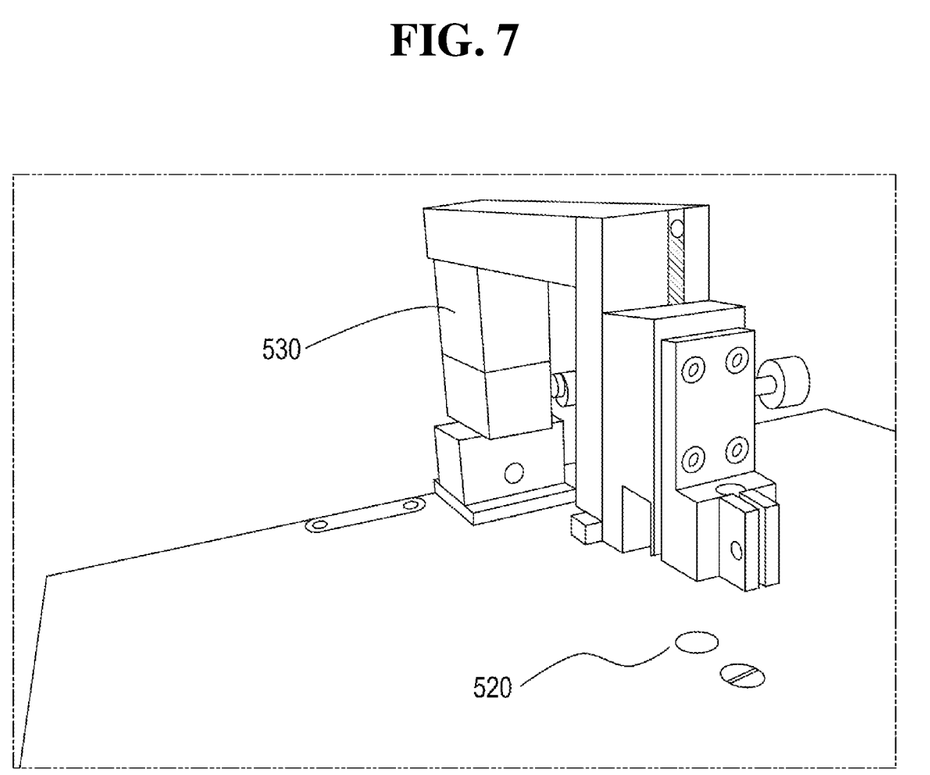

Meanwhile, the apparatus 500 for measurement according to the present invention is provided with a body 510, which has a top surface 511 on which a sample can be placed, at the center of which the bottom tip 520 is located, and which includes a decompression unit within the body 510, and a fixing unit 530, which is positioned at a side surface of the body 510 and to which the sensor 540 having a sensor tip 541 is fixed to measure thickness. FIG. 5 shows the perspective view thereof. Actual photographs of the top surface 511 and the fixing unit 530 of the finished apparatus 500 are shown in FIG. 6 and FIG. 7.

As described above, the present inventor found a means to reduce errors and deviations in application of a commercially available sensor to the thickness of electrode materials, by using various methods, in order to meet the current demand for high precision and high accuracy due to the thickness reduction. Accordingly, the present inventor developed an apparatus for measurement of thickness which minimizes errors and deviations, by improving the tip and the decompression unit, and the like. The apparatus has almost no variation depending on the operator. It enabled to significantly increase the precision of thickness measurement in the current processes. In addition, it enabled to apply strict standards for defective products, resulting in significant improvement of the manufacturing processes for batteries using electrode materials.

INDUSTRIAL APPLICABILITY

The present invention provides a method for measuring the thickness of electrode materials, which has a reduced thickness, with high precision and high accuracy. It achieves the deviation between measurements of up to a maximum of 0.04 μm and a tolerance of 9.0% or less.

The invention claimed is:

1. An apparatus for measuring thickness of materials including an electrode and a separator that are used for batteries, the apparatus comprising:
    an inductive sensor for measuring a length displacement, wherein the sensor comprises a sensor tip having a spherical surface that is retracted by vacuum;
    a bottom tip disposed on an opposite side of the sensor tip with respect to a sample to support the sample, wherein the bottom tip includes a spherical surface;
    a decompression unit comprising a pump capable of applying a predetermined reduced pressure to retract the sensor tip, a motor, a power source, and a controller;
    a body including a top surface on which the sample is placed, wherein the bottom tip is disposed at a center of the body; and
    a fixing unit disposed on the body, wherein the sensor is fixed to the fixing unit for measuring a thickness of the sample.

2. The apparatus for measuring thickness according to claim 1, further comprising:
    a display for displaying values measured by the sensor; and
    an output unit for outputting the measured values to be displayed on the display.

3. The apparatus for measuring thickness according to claim 1, wherein the bottom tip and the sensor tip are made of a resin or a metal.

4. The apparatus for measuring thickness according to claim 1, wherein the controller includes a mode capable of providing the predetermined reduced pressure, either manually or periodically and automatically.

5. The apparatus for measuring thickness according to claim 4, wherein the reduced pressure is determined to allow measurement error due to decompression of the decompression unit to be equal to or less than ±0.1 μm.

6. A method for measuring thickness of thin materials used for batteries using the apparatus for measuring thickness according to claim 1.

7. A method for discriminating defects of thin materials used for batteries, comprising the steps of:
   1) Measuring thickness of a thin material used for batteries with the apparatus for measuring thickness according to claim 1; and
   2) Comparing the value measured at the step 1) with a predetermined reference value to determine whether the material is defective.

8. The apparatus for measuring thickness according to claim 1, wherein the sensor includes a maximum distance of measurement displacement of 4 mm, a maximum measurement error of equal to or less than 0.01% of the measurement displacement and equal to or less than 0.4 µm, a measurement force of 0.75 N, and a measurement force increment per distance increment of 0.08 N/mm.

* * * * *